(12) United States Patent
Das et al.

(10) Patent No.: US 9,792,507 B2
(45) Date of Patent: Oct. 17, 2017

(54) METHOD AND SYSTEM FOR GROUND TRUTH DETERMINATION IN LANE DEPARTURE WARNING

(71) Applicant: Tata Consultancy Services Limited, Mumbai (IN)

(72) Inventors: Apurba Das, Bangalore (IN); Nagavajyula Siva Srinivasa Murthy, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 78 days.

(21) Appl. No.: 14/875,229

(22) Filed: Oct. 5, 2015

(65) Prior Publication Data

US 2016/0307050 A1 Oct. 20, 2016

(30) Foreign Application Priority Data

Apr. 17, 2015 (IN) .......................... 1594/MUM/2015

(51) Int. Cl.
*G06K 9/00* (2006.01)
*G06K 9/46* (2006.01)
*G06K 9/52* (2006.01)
*G06K 9/62* (2006.01)
*G06T 7/60* (2017.01)
*G06T 7/13* (2017.01)

(52) U.S. Cl.
CPC ....... *G06K 9/00798* (2013.01); *G06K 9/4604* (2013.01); *G06K 9/4642* (2013.01); *G06K 9/52* (2013.01); *G06K 9/6218* (2013.01); *G06T 7/13* (2017.01); *G06T 7/60* (2013.01); *G06T 2207/20112* (2013.01); *G06T 2207/30256* (2013.01)

(58) Field of Classification Search
None
See application file for complete search history.

(56) References Cited

U.S. PATENT DOCUMENTS

| 7,362,883 B2 | 4/2008 | Otsuka et al. |
| 8,976,040 B2 | 3/2015 | Ray Avalani |
| 2012/0050489 A1* | 3/2012 | Gupta ................ G06K 9/00798 348/46 |

OTHER PUBLICATIONS

Borkar ("A Novel Lane Detection System With Efficient Ground Truth Generation" IEEE Transactions on Intelligent Transportation Systems, vol. 13, No. 1, Mar. 2012, pp. 365-374).*

(Continued)

*Primary Examiner* — Weiwen Yang
(74) *Attorney, Agent, or Firm* — Shumaker, Loop & Kendrick, LLP

(57) ABSTRACT

Systems and methods for ground truth determination in lane departure warnings are provided. The methods include receiving time slice images of a lane captured at different time frames from an image capturing unit. The intensity profiles of these time slice images are determined and these intensity profiles of the images are smoothened to obtain a smoothened histogram. A threshold value of these time sliced images are determined and further refined to extract the lane marking of a lane. The lane extended to multiple rows of a lane to determine the ground truth value used for validating a lane departure warning.

20 Claims, 8 Drawing Sheets

(56) References Cited

OTHER PUBLICATIONS

Gonzalez ("Lane Detection Using Histogram-Based Segmentation and Decision Trees", 2000 IEEE Intelligent Transportation Systems Conference Proceedings, pp. 346-351).*
Qin ("Curb-Intersection Feature Based Monte Carlo Localization on Urban Roads." 2012 IEEE International Conference on Robotics and Automation, IEEE, pp. 2640-2646).*
Amol Borkar, Monson Hayes and Mark T. Smith, "An Efficient Method to Generate Ground Truth for Evaluating Lane Detection Systems" Center for Signal and Image Processing (CSIP) & Institut for Tillampad Informationsteknik; 2010 (4 pages).
Ali Alsarraf, Bok-Suk Shin and Zezhong Xu, Richard Klette, "Ground Truth and Performance Evaluation of Lane Border Detection"; Computer Science Department, Tamaki Innovation Campus, The University of Auckland, New Zealand (11 pages).
Apurba Das and Kuntal Ghosh, "Enhancing Face Matching in a Suitable Binary Environment", 2011 International Conference on Image Information Processing (ICIIP 2011) (6 pages).
Apurba Das, Anirban Roy and Kuntal Ghosh, "Proposing a CNN Based Architecture of Mid-level Vision for Feeding the Where and What Pathways in the Brain" Springer-Verlag Berlin Heidelberg 2011 (pp. 559-568) (10 pages).

* cited by examiner

METHOD AND SYSTEM FOR GROUND TRUTH DETERMINATION IN LANE DEPARTURE WARNING

CROSS-REFERENCE TO RELATED APPLICATIONS AND PRIORITY

The present application claims priority to Indian Provisional Patent Application No. 1594/MUM/2015, filed on Apr. 17, 2015 the entirely of which is hereby incorporated by reference.

TECHNICAL FIELD

The embodiments herein generally relate to digital image processing, and, more particularly, to determining ground truth in a lane departure warning.

BACKGROUND

There are known driving support apparatuses making various controls during driving, especially when driving on the freeway or highway. There are also many known methods that support lane marking and/or lane recognition. It is necessary to accurately estimate positions of lane lines in order to appropriately drive a vehicle along the lane lines. Automotive imaging is a recent trend of research to assist drivers that may ultimately result in a driver-less car. Along with state-of-art algorithm, state-of-art validation framework is a requirement to ensure system quality.

In automotive imaging, an offline video marking ground-truth determination is a tedious task by the tester or user. Typically a camera captures in the frequency of 30 image frames per second and marking these manually is a tedious task. Further, scenarios like sudden variation in the environment, sudden inclusion of a foreign object on the lane marks, and multiple lanes in the field of view of the camera are the major challenges. Since ground truth value(s) will be the reference to judge the accuracy of lane departure applications, even minor errors are not acceptable. Available binarization methods may not be compatible with the aforementioned problem scenarios. Hence, the tester should be the supervisor of the automated algorithm and may be able to switch to manual implementation whenever required.

SUMMARY

This summary is provided to introduce aspects related to method and system for ground truth determination for lane departure warning systems and their aspects are further described below in the detailed description. This summary is not intended for use in determining or limiting the scope of the subject matter.

In one implementation, a method for ground truth determination in lane departure warning is disclosed. The method may include receiving lane images as an input from an image capturing unit. Further, processing the lane images into a plurality of time sliced images captured at different time frames. The method may further include determining an intensity profile of each of the plurality of time sliced images and smoothening the intensity profile to obtain a smoothened histogram. Further, obtaining a threshold value for each of the time-sliced images by extracting a minima between a first maxima and a successive second maxima of the smoothened histogram. The method may further include refining the threshold value of the time-sliced images by segmenting the time sliced images to obtain a plurality of individual time slices, calculating a statistical mean variation of the intensity profile of each of the individual time slices and grouping the individual time slices having a mean intensity within a predefined range in to a cluster of slices and determining a minima between a first maxima and a successive second maxima of the intensity profile of the cluster of slices. The method may further include detecting a lane marking of the lane by extracting the mid-points of the marking based on the refined threshold value of the time sliced images and determining the ground truth value based on the lane marking of the lane for validating a lane departure warning.

The method may further include validating a lane departure warning application output based on a pixel position detected by the lane departure warning application, with respect to the determined ground truth, by calculating the Percentage Detection Accuracy=True Detection/Total Boundary Detection*100; wherein Total Boundary Detection is number of pixels in the Ground Truth and True Detection is number of pixels in the lane departure warning application.

The method may further include sub-grouping the individual time slices having a mean intensity outside a predefined range in to a cluster of slices and determining a minima between a first maxima and a successive second maxima of the intensity profile of the cluster of slices.

The method of refining the threshold value further includes allowing a user to perform at least one of selecting the number of frames of the lane and defining the boundaries of the lane.

The method of determining ground truth may further include filling discontinuities in the lane by interpolation through lane boundary correspondence, wherein the lane boundary correspondence includes detecting lane marks by measuring a distance between a left and a right mark of the lane and mapping to the image frame.

In one implementation, a system for ground truth determination in lane departure warning is disclosed. The system includes an image capturing unit and an image database communicatively coupled to the image capturing unit; the image database configured to receive lane images from the image capturing unit. The system further includes of an image processing unit. The image processing unit includes a processor and a memory coupled to the processor. The processor executes a plurality of modules stored in the memory. The plurality of modules includes, a receiving module may receive a lane image as an input from the image database. Further, an image processing module may process the lane images received from the receiving module to obtain plurality of time slice images captured at different time frames. Furthermore, the processing module obtains a threshold value for each of the time-sliced images by extracting a minima between a first maxima and a successive second maxima of the smoothened histogram. Furthermore, a processing module refines the threshold value of the time-sliced images by: segmenting the time sliced images to obtain a plurality of individual time slices, calculating a statistical mean variation of the intensity profile of each of the individual time slices and grouping the individual time slices having a mean intensity within a predefined range in to a cluster of slices and determining a minima between a first maxima and a successive second maxima of the intensity profile of the cluster of slices. Further a detection module may detect lane marking of the lane by extracting the mid-points of the marking based on the refined threshold value of the time sliced images; and determine the ground truth value based on lane markings.

The plurality of modules further includes a validation module for validating for validating a lane departure warning application output based on a pixel position detected by the lane departure warning application, with respect to the determined ground truth.

The processing module may further sub-groups the individual time slices having a mean intensity outside a predefined range in to a cluster of slices and determining a minima between a first maxima and a successive second maxima of the intensity profile of the cluster of slices.

In another implementation, a non-transitory computer readable medium embodying a program executable in a computing device for determining the ground truth in lane departure warning is disclosed. The program may include a program code for receiving lane images as an input from an image capturing unit. The program may further include a program code for processing the lane images into a plurality of time sliced images captured at different time frames. The program may further include a program code for determining an intensity profile of each of the plurality of time sliced images and smoothening the intensity profile to obtain a smoothened histogram. The program may further include a program code for obtaining a threshold value for each of the time-sliced images by extracting a minima between a first maxima and a successive second maxima of the smoothened histogram. The program may further include a program code for refining the threshold value by segmenting the time sliced images to obtain a plurality of individual time slices, calculating a statistical mean variation of the intensity profile of each of the individual time slices and grouping the individual time slices having a mean intensity within a predefined range in to a cluster of slices and determining a minima between a first maxima and a successive second maxima of the intensity profile of the cluster of slices. The program may further include a program code for detecting a lane marking of the lane by extracting the mid-points of the marking based on the refined threshold value of the time sliced images and a program code for determine the ground truth value based on the lane marking of the lane for validating a lane departure warning.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

While aspects of described device and method for detecting objects at multiple ranges simultaneously may be implemented in any number of different computing devices, environment, and/or configuration, the embodiments are described in the context of the following exemplary devices.

Figure 1:
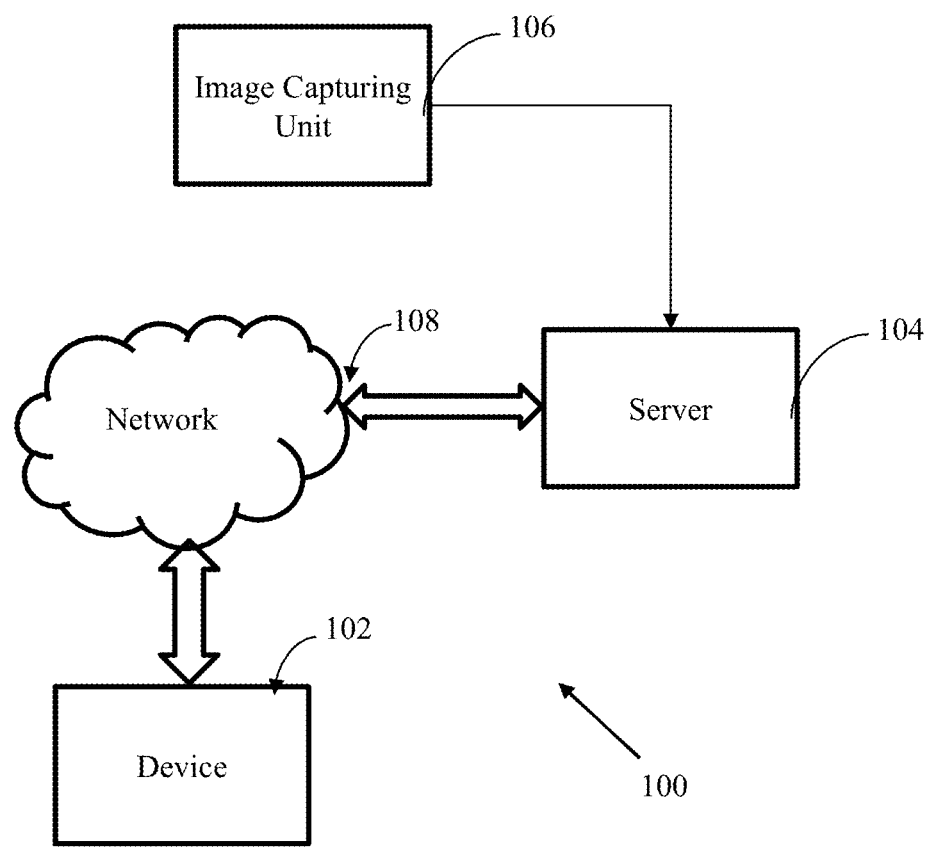
FIG. 1 illustrates a network implementation of a server and a device for determining ground truth in a lane departure warning, in accordance with an example embodiment of the present disclosure.

FIG. 1 illustrates a network implementation of a server and a device for determining ground truth in a lane departure warning, in accordance with an example embodiment of the present disclosure. In one embodiment, the environment 100 includes at least one device, for example a device 102, a server 104, an image capturing unit 106, and a communication network 108. It will be noted herein that the number of devices and/or networks, illustrated in FIG. 1, is provided for explanatory purposes only. In practice or some example scenarios, there may be additional or fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. In one example, the image capturing unit 106 and the server 104 may be combined into a single device and/or system. Devices and/or networks of environment 100 may interconnect via wired connections, wireless connections, or a combination of wired and wireless connections.

The device 102 may include any computation or communication device that is capable of communicating via the communication network 108. For example, the device 102 may be implemented in a variety of communication devices such as a laptop computer, a desktop computer, a notebook, a workstation, a mobile phone, a personal digital assistant (PDA), and so on. The device 102 is further configured to determine the ground truth in lane departure warning system by image processing, for example, the device 102 may be an image processing unit.

The server 104 may include one or more server devices, or other types of computation and communication devices, that provide content. For example, server 104 may host a website that can be accessed, by the device 102, to receive content (e.g., web pages, video, audio, images, advertising content, text, data, and/or some combination thereof), and/or a service. For example, the server 104 may be accessed by a user of the device 102 for accessing, for example, lane images captured by an image capturing unit 106. The server 104 may receive an access request from the device 102 for facilitating access to lane images. In response to the request, the server 104 may redirect the device 102 to the image capturing unit 106 for the user to access the images. The server 104 may provide the content and/or service to device 102 via network 108. In an alternative embodiment, the server 104 may host an application that communicates with network 108 to process the request from the user.

Figure 2:
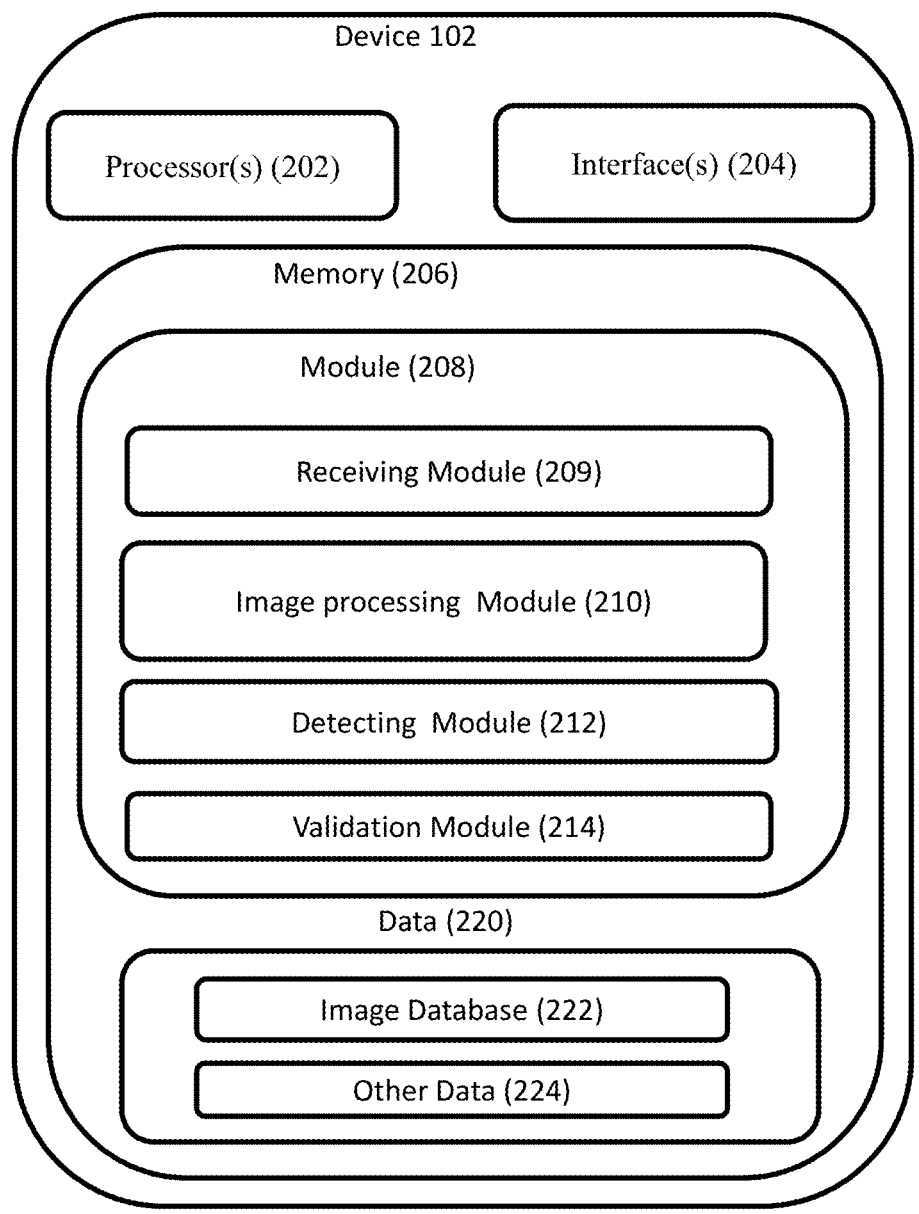
FIG. 2 illustrates the device, in accordance with an example embodiment of the present disclosure.

FIG. 2 is a block diagram of a device, for example, the device 102 of FIG. 1, in accordance with an example embodiment. The device 102 includes or is otherwise in communication with at least one processor such as a processor 202, at least one memory such as a memory 204, and a user interface 206. The processor 202, the memory 204, and the user interface 206 may be coupled by a system bus such as a system bus or a similar mechanism (not shown in Figure). Although FIG. 2 shows example components of the device 102, in other implementations, the device 102 may contain fewer components, additional components, different components, or differently arranged components than depicted in FIG. 2.

The processor 202 may include circuitry implementing, among others, audio and logic functions associated with the communication. The processor 202 may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The memory 204, may store any number of pieces of information, and data, used by the device 102 to implement the functions of the device 102. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 204 may be configured to store information, data, applications, instructions or the like for enabling the device 200 to carry out various functions in accordance with various example embodiments. Additionally or alternatively, the memory 204 may be configured to store instructions which when executed by the processor 202 causes the device 200 to behave in a manner as described in various embodiments. The memory 204 may include modules 208 and data 220.

The modules 208 include routines, programs, objects, components, data structures, etc., which perform particular tasks or implement particular abstract data types. In one implementation, the modules 208 may include a receiving module 209, an image processing module 210, detecting module 212, validating module 214, and other modules 220. The other modules 220 may include programs or coded instructions that supplement applications and functions of the device 102.

The data 220, amongst other things, serves as a repository for storing data processes, received, and generated by one or more of the module 208. The data 220 may also include an image database 222, and other data 224.

Figure 3:
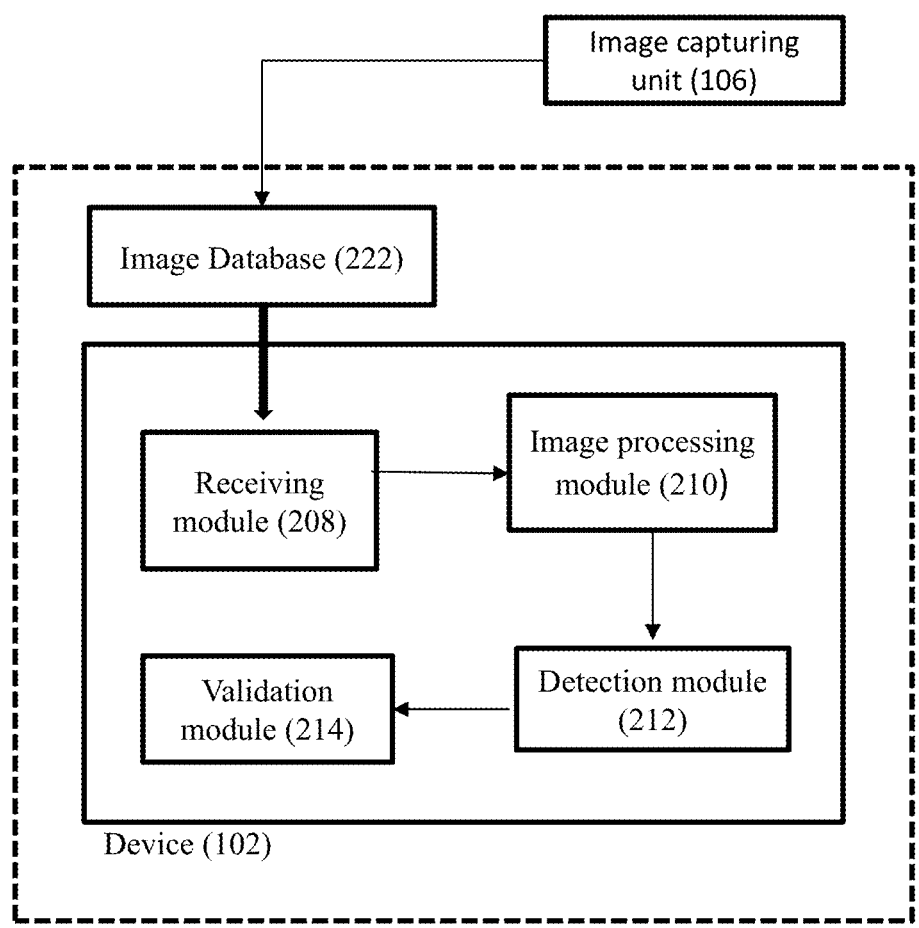
FIG. 3 illustrates a detailed working of the device, in accordance with an example embodiment of the present disclosure.

FIG. 3 illustrates detailed working of the block diagram of device 102 as depicted in FIG. 2, in accordance with an example embodiments of the present disclosure. The image/video of a lane is captured using any conventionally available image capturing unit 106 and the recorded image/video set is stored in the image database 222. In one exemplary embodiment, the image database 222 and may be located within the device 102 as shown in FIG. 3. In another example embodiment the image database 222 may be located remotely from the device 102. For example, the image location would vary with respect to movement of the image capturing unit 106 mounted on a vehicle. The variation may be with respect to intensity profile and environmental illumination profile.

The stored images are received and read by the receiving module 208 and processed in the image processing module 210 using one or more processors 202. As a first step of the image processing, the images are time sliced. In an exemplary embodiment, a recorded video obtained from the image capturing unit 106 contains a plurality of image frames. Each frame is taken at different time slots of the recorded image, for example, a first frame is at 1 s, a second frame is at 2 s, a third frame is at 3 s, and likewise, in this case the capture rate of the frame is 1 s. Each frame is of the same size and are uniformly sliced to contain multiple rows, for example each frame may contain row 1 to row 30. A particular row, for example $10^{th}$ row amongst multiple rows is selected and it becomes the first time slice image. Likewise, $10^{th}$ row from other frames are selected to obtain plurality of time slice images.

Figure 4A:
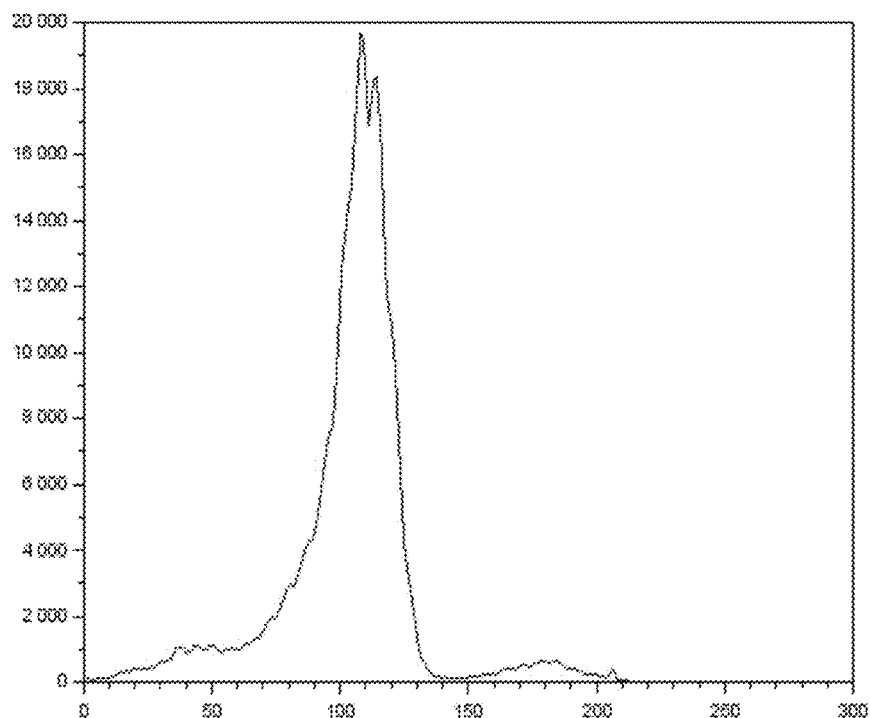
FIGS. 4(a) and 4(b) illustrates an original histogram profile and smoothed histogram of a time sliced gray image, in accordance with an example embodiment of the present disclosure.
Figure 4B:
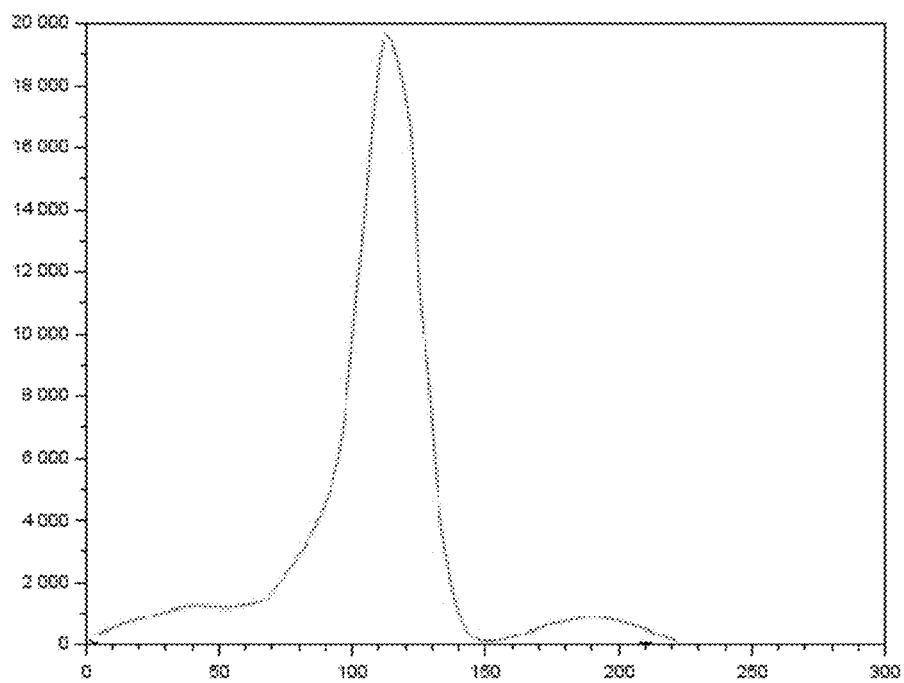

Further, the image processing module 210 may determine the intensity profile or histogram of each time sliced image. The histogram of the time sliced image may contain some additional peaks and spikes excluding the well-defined symmetric near Gaussian intensity profile (as shown in FIG. 4a). Hence, a pre-smoothing operation is performed on the histogram in order to extract the low pass filtered envelop of the histogram or intensity profile. Histogram envelope is extracted through smoothing process (as shown in FIG. 4b). Further the processing module 210 determines a threshold value by detecting a minima between two well-defined maxima of the smoothened histogram. The well-defined maxima contains a first maxima, where the first maxima is a highest peak of the smoothened histogram and a second maxima where the successive second maxima is a following highest peak of the first maxima. Herein, the minima between these two peaks is considered as the threshold value. This technique may be referred as Min-Between-Max-Thresholding (MBMT). In an example embodiment, the intensity profile or the histogram of the time sliced image have highest peak at intensity around the mid-intensity range. The successive next highest peak with a similar symmetry of intensity profile of the time-sliced image is around a high intensity which corresponds to the lane marking.

Figure 5A:
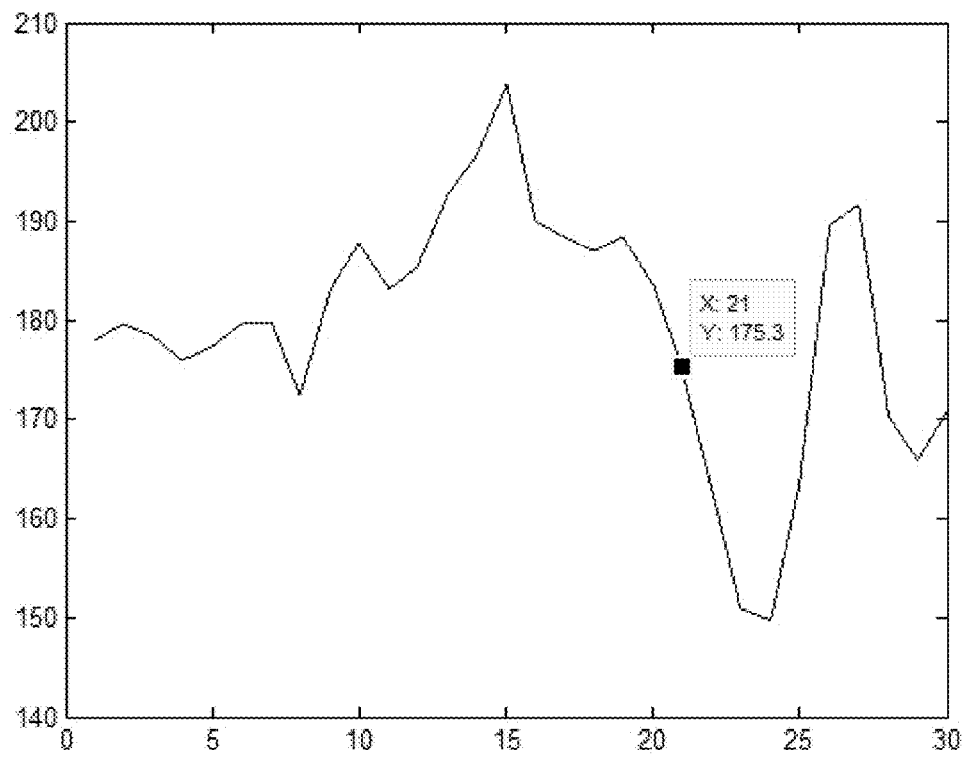
FIGS. 5(a) and 5(b) illustrate grouping and sub-grouping of slices based on statistical mean, in accordance with an example embodiment of the present disclosure.
Figure 5B:
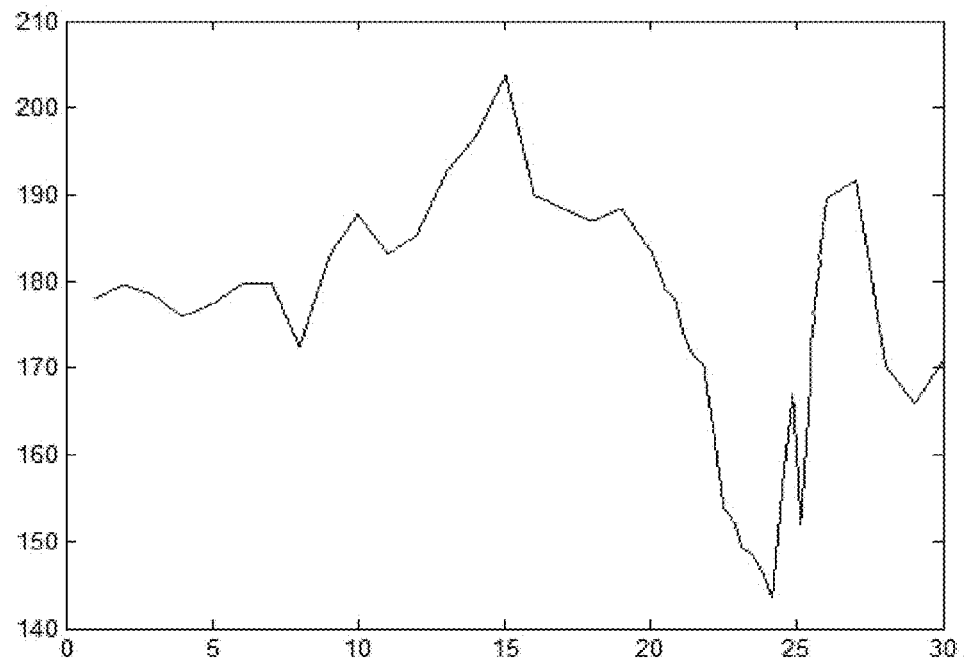

Further, the image processing module 210 refines the threshold value by again applying the above technique (MBMT). In this stage, the time slice images are uniformly segmented within a frame to obtain an individual slice. The statistical mean variation of the each individual slice is calculated. Further, the image processing module 210, groups (uniform slicing) the individual slices having a mean intensity values within a predefined range in to a cluster of slices and a mean between a first maxima and a successive second maxima of intensity profile of the cluster of slices is determined. In exemplary embodiments, 30 slices of the time slice images are considered. Based on the value of the statistical mean, the slices are grouped and localized, for example, a predefined range of 180±10 is considered as a single group (as shown in FIG. 5a) and slices having mean in that region are grouped together and MBMT technique is applied. If a drastic change in mean is observed, a value outside the predefined range (as shown in FIG. 5b), further sub-grouping is performed (non-uniform slicing) and MBMT technique is applied. The drastic change in mean may be due to presence of an obstacle in the slice.

Figure 6A:
FIGS. 6(a), 6(b) and 6(c) illustrates an original lane, original lane image in gray scale and a binary image of the lane marking obtained, in accordance with an example embodiment of the present disclosure.
Figure 6B:
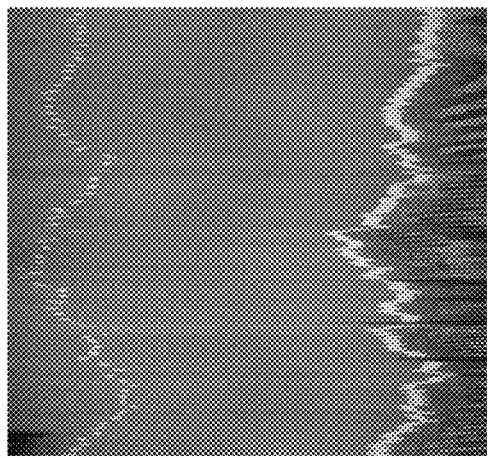
Figure 6C:
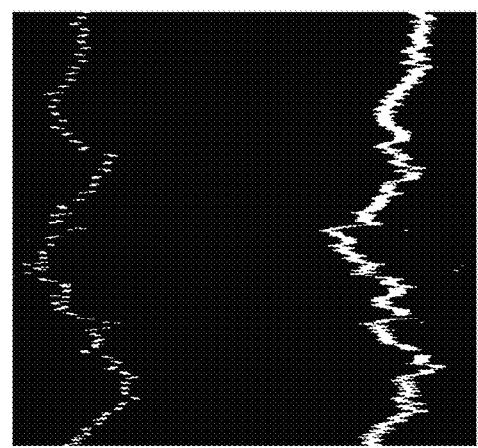
Figure 7A:
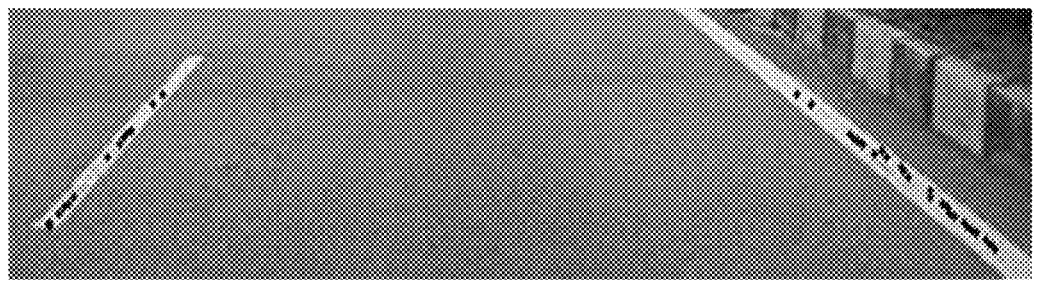
FIGS. 7(a), 7(b) and 7(c) illustrates mid-point mapping on the original frame by ground truth and combination of ground truth and lane boundary correspondence, in accordance with an example embodiment of the present disclosure.
Figure 7:
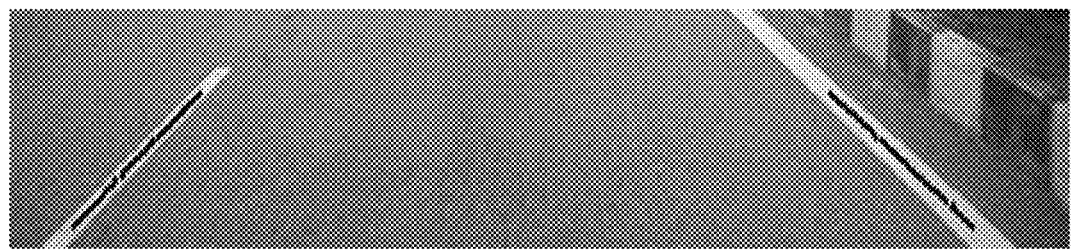
Figure 7:
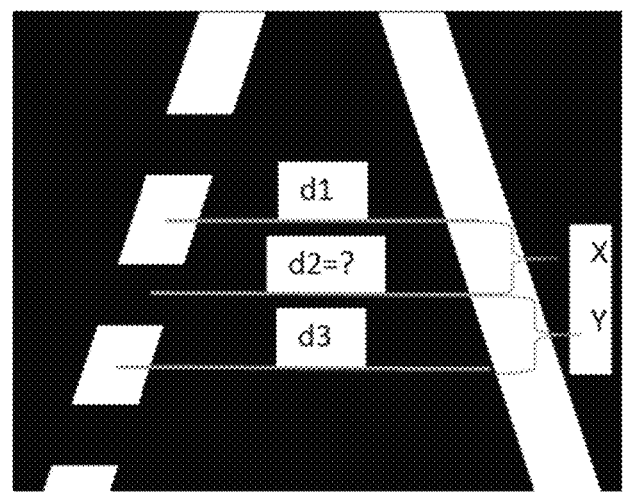

Further, after applying the MBMT technique, the time slice images are in the form of a binary image (as shown in FIG. 6c), where the lane marking are represented as white pixels and anything other than lane marking as black pixels. Before applying MBMT the lane image is in gray scale (as shown in FIG. 6b) and original lane image (as shown in FIG. 6a). Further, the detection module 212 detects the lane markings by extracting the mid-points of two white patches (as shown in FIG. 7) of a lane which corresponds to a lane markings, the mid-points are extracted based on the refined threshold value obtained by applying the MBMT. The mid-point of each lane width is detected as ground truth lane points which is mapped to the original frame of the video/image. Herein, the midpoints of the lane markings are inverse mapped to the original frames of the video. This is extend to multiple rows to determine multiple points on the lane marking and mapped on to the original frames (as shown in FIG. 7a) to determine the ground truth for validating a lane departure warning.

Further, any gap in the time-slice due to the structure of the lane, for example, discontinued lane, occluded lane, dotted lane, noise is filled up by interpolation through lane boundary correspondence (LBC). In LBC, the distance between adjacent lane markings that is the left and right mark of a lane are measured whenever a lane marks on both sides are detected. The gaps are filled using the following equation and mapped to the original frame (as shown in FIG. 7b):

$$d2=(d1 \times X + d3 \times Y)/(X+Y)$$

Wherein the distance between the corresponding lanes where MBMT detected lane markings are d1 and d3 respectively, then unknown lane center can be marked by determining d2 through d1, d2 and row distances between unknown to upper known lane (X) and unknown to lower known lane marks (Y) (as shown in FIG. 7c)

Further the validation module 214 facilitates the validation of any lane warning application with respect to the determined ground truth. The validation of the lane departure warning may be based on pixel position detections or warnings given by the complete system of lane departure warning. In an example embodiment, pixel based detection accuracy is described. The boundary around the ground truth value that is the lane mid-points obtained from the above described steps is determined. The boundary, around the ground truth, is the left and right edge of the lane marking is considered as actual or total detection boundary. The application (any lane departure warning application) detections line on the lane marking within the actual or total boundary is considered as true detection. The accuracy of any lane departure application is calculated using the formula Percentage Pixel Detection Accuracy=True Detection/Total Boundary Detection*100

Where Actual Detection→No of Pixels in the Ground Truth or Actual boundary
True Detection→No of Pixels in the Application lane with in Actual boundary Further, pixel detections outside the actual or total detection boundary of Ground Truth is excluded in calculating the accuracy of the lane departure. The pixel detection outside the actual or total detection, i.e., anything other than the actual boundary is considered as false detection.

Further, the MBMT is discussed in the above steps is based on intensity profile and statistical divergence. The ground truth is used as a baseline frame work and is considered as reference at the validation step minor error needs to be taken care of. Hence this method also allows manual intervention at two stages.

The device 102 further includes an option for manual intervention at two stages
(a) allowing a user to define number of frames that needs to be processed in the image processing module; and
(b) allowing a user to select the boundaries around the lane that will be considered as lane image (excluding the noises), for image processing.

The device 102 may include a user defined boundary selection window (not shown in figure). This helps a user to select a single lane out of multiple lanes and improve the quality of lane by selecting the required boundary around the lane. The user may also have a provision to reject and redraw the boundary of the lane. Further, it includes an option to run and pause the selection until the lanes are within a chosen boundary.

Figure 8:
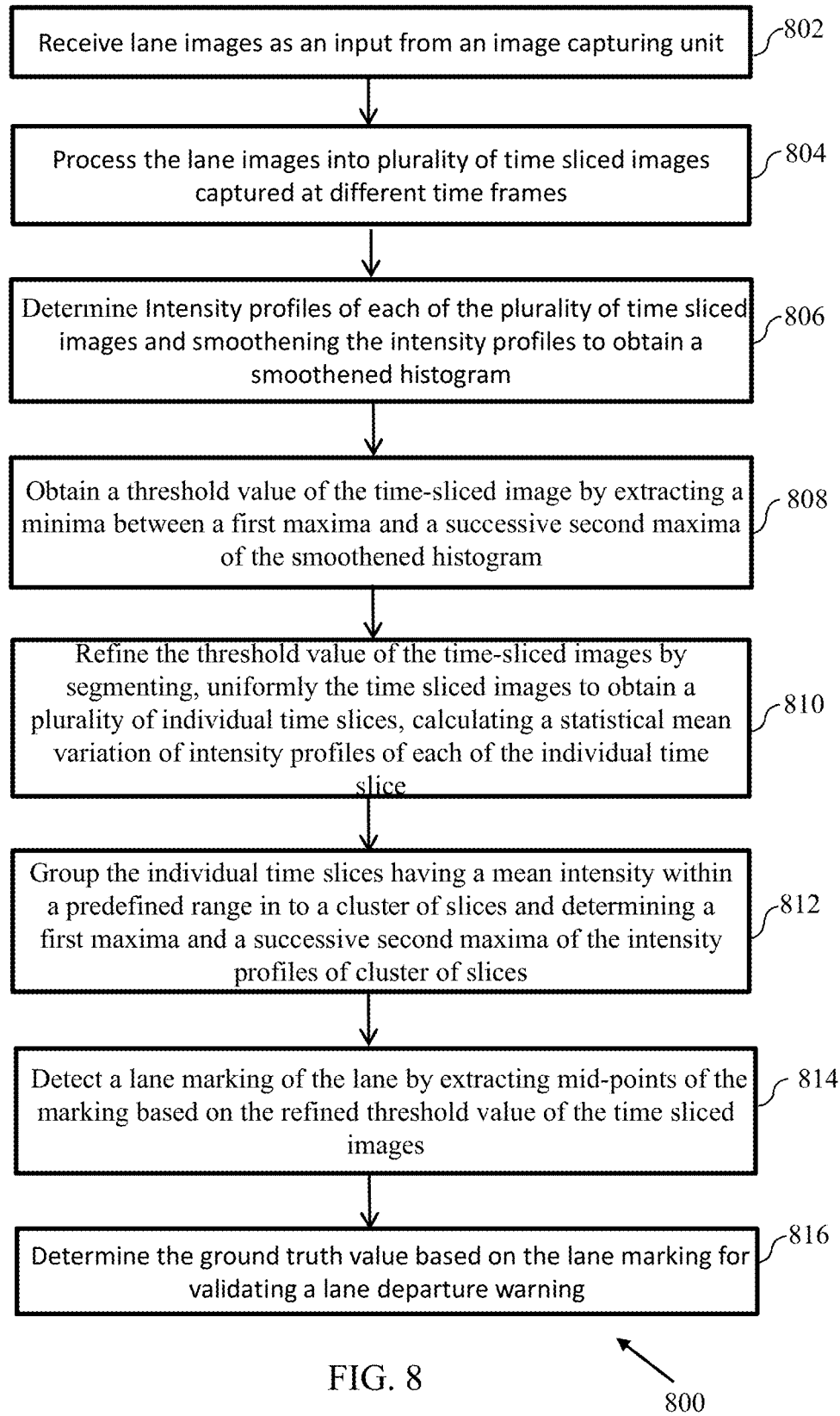
FIG. 8 illustrates a flow diagram for determining ground truth in a lane detecting warning, in accordance with an example embodiment of the present disclosure.

FIG. 8 illustrates a flow diagram of a method 800 for determining ground truth in a lane departure warning, in accordance with the present disclosure.

At 802, the method includes receiving lane images as an input from an image capturing unit, by at least one image capturing unit mounted on a vehicle. For example, the image is captured by one or more image capturing unit mounted on a vehicle, wherein the image capturing unit captures continuous image of a lane. At 804, the lane images are processed to create plurality of time slice images. Herein, the time slice images are created by capturing the lane images at different time and thereby creating multiple frames. The frames comprises of multiple rows and each row taken at different time slot is considered a time sliced image. In one of the example embodiments, a user may select the number of frames of the lane and define the boundaries of the lane to be processed. At 806, intensity profile of each time sliced image is determined. Further, the intensity profiles containing some additional peaks and spikes are smoothened. At 808, threshold value of the time-sliced image is obtained by extracting a minima between a first maxima and a successive second maxima of the smoothened histogram. Herein, the first maxima is a highest peak of the smoothened histogram and the successive second maxima is a following highest peak of the first maxima (as shown in FIG. 4).

At 810, the threshold value of the time-sliced image is further refined by segmenting the time sliced images to obtain a plurality of individual time slices and a statistical mean variation of the intensity profile of each of the individual time slices is calculated. The statistical mean variation is based on the statistical divergence between each slices of the time sliced images. Further, at 812 the individual slices having a mean intensity within a predefined range are grouped in to a cluster of slices and a minima between a first maxima and a successive second maxima of the intensity profile of the cluster of slices is determined. At 814, the lane marking of the lane are detected by extracting mid-points of the marking based on the refined threshold value of the time sliced images. Herein, the time sliced images is a binary image and lane markings are represented as white pixels and anything other than lane marking as black pixels in the binary image of the lane.

Further, at 816, the ground truth value based on lane markings is determined. The ground truth value is further corrected by filling discontinuities in the lane by interpolation through lane boundary correspondence, wherein lane boundary correspondence comprises detecting lane marks by measuring the distance between left and right mark of a lane and mapping to the image frame. The discontinuities in a lane may be discontinued lane, occluded lane, dotted lane and noise. Further, the determined ground truth is applied for validating a lane departure application output based on pixel position detected by the lane departure application. The detection accuracy is calculated with respect to the determined ground truth.

What is claimed is:

1. A computer implemented method for ground truth determination in a lane departure warning, wherein the ground truth is determined based on a lane marking, the computer implemented method comprising:
  receiving a plurality of lane images or a lane video comprising the plurality of lane images as an input from an image capturing unit;
  processing the plurality of lane images into a plurality of time sliced images, wherein each time sliced image contains selection of predefined rows of the plurality of lane images, wherein the plurality of lane images are captured at different time frames;
  determining a histogram of each of the plurality of time sliced images and smoothening the histogram to obtain a smoothened histogram, wherein the smoothening is performed on the histogram to extract low pass filtered envelop of the histogram;
  obtaining a threshold value for each of the time sliced images by extracting a minima between a first maxima and a successive second maxima of the smoothened histogram, wherein the first maxima is a highest peak of the smoothened histogram and the successive second maxima is a following highest peak of the first maxima, wherein extracting the minima between the first maxima and the successive second maxima of the smoothened histogram is termed as Min-Between-Max-Thresholding (MBMT) technique;
  refining the threshold value of the time sliced images by:
    segmenting each of the time sliced images into a predefined number of time slices by further applying time slicing on the each time sliced image,
    calculating a statistical mean variation of the histogram of each of the individual time slices, and
    grouping the individual time slices having a mean intensity within a predefined range into a cluster of time slices, wherein a predefined number of time slices having the mean intensity in the predefined range are grouped and localized, and
    determining the minima between the first maxima and the successive second maxima of the histogram of the cluster of time slices by applying the MBMT technique to obtain refined threshold for each cluster of time slices;
  detecting the lane marking of the lane by extracting mid-points of the lane marking based on the refined threshold value of the time sliced images; and
  determining the ground truth based on the lane marking of the lane for validating the lane departure warning based on a pixel position detected by the lane departure warning with respect to the determined ground truth.

2. The method of claim 1, further comprising validating the lane departure warning based on the pixel position detected by the lane departure warning, with respect to the determined ground truth, by calculating based on: Percentage Detection Accuracy=True Detection/Total Boundary Detection*100; wherein Total Boundary Detection is a number of pixels in the Ground Truth and True Detection is a number of pixels in the lane departure warning application.

3. The method of claim 2, wherein the pixel detection outside the actual or total detection are excluded.

4. The method of claim 1, further comprising sub-grouping the individual time slices having a mean intensity outside a predefined range into the cluster of the slices and determining a minima between a first maxima and a successive second maxima of the histogram of the cluster of slices.

5. The method of claim 1, processing the time slice images further comprises allowing a user to perform at least one of selecting the number of frames of the lane and defining the boundaries of the lane.

6. The method of claim 1, determining the ground truth further comprises filling discontinuities in the lane by interpolation through lane boundary correspondence, wherein the lane boundary correspondence comprises detecting the lane marking by measuring a distance between a left and a right mark of the lane and mapping to the image frame.

7. The method of claim 6, wherein the discontinuities in the lane is at least one of a discontinued lane, an occluded lane, a dotted lane, and noise.

8. The method of claim 1, wherein the statistical mean variation is based on the statistical divergence between each individual time slice of the time sliced images.

9. The method of claim 1, wherein determining the ground truth further comprises inverse mapping the detected midpoint on to the lane images obtained by the image capturing unit.

10. The method of claim 1, wherein the time sliced images after obtaining the refined threshold values are binary images.

11. The method of claim 10, wherein the lane markings are represented as white pixels and anything other than lane markings as black pixels in the binary images of the lane.

12. A system for ground truth determination in a lane departure warning, wherein the ground truth is determined based on a lane marking, the system comprising:
  an image capturing unit;
  an image database communicatively coupled to the image capturing unit;
  the image database configured to receive a plurality of lane images or a lane video comprising the plurality of lane images from the image capturing unit;
  an image processing unit, wherein the unit comprising:
  a processor;
  a memory coupled to the processor; the memory comprising:
  a receiving module for receiving the plurality of lane images or the lane video comprising the plurality of lane images as an input from the image database;
  an image processing module for
  processing the plurality of lane images received from the receiving module to obtain a plurality of time sliced images, wherein each time sliced image contains selection of predefined rows of the plurality of lane images, wherein the plurality of lane images are captured at different time frames;
  determining a histogram of each of the plurality of time sliced images and smoothening the histogram to obtain a smoothened histogram, wherein the smoothening is performed on the histogram to extract low pass filtered envelop of the histogram;

obtaining a threshold value for each of the time sliced images by extracting a minima between a first maxima and a successive second maxima of the smoothened histogram, wherein the first maxima is a highest peak of the smoothened histogram and the successive second maxima is a following highest peak of the first maxima, wherein extracting the minima between the first maxima and the successive second maxima of the smoothened histogram is termed as Min-Between-Max-Thresholding (MBMT) technique;

refining the threshold value of the time sliced images by:
   segmenting each of the time sliced images into a predefined number of time slices by further applying time slicing on the each time sliced image,
   calculating a statistical mean variation of each of the individual time slices; and
   grouping the time slices having a mean intensity within a predefined range into a cluster of time slices, wherein a predefined number of time slices having the mean intensity in the predefined range are grouped and localized and
   determining the minima between the first maxima and the successive second maxima of the histogram of the cluster of time slices by applying the MBMT technique to obtain refined threshold for each cluster of time slices; and a detection module for detecting the lane marking of the lane by extracting mid-points of the lane marking based on the refined threshold value of the time sliced images, and determining the ground truth value based on the lane marking of the lane for validating the lane departure warning based on a pixel position detected by the lane departure warning with respect to the determined ground truth.

13. The system of claim 12, the memory further comprises a validation module for validating a lane departure warning based on the pixel position detected by the lane departure warning, with respect to the determined ground truth by calculating as follows: Percentage Detection Accuracy=True Detection/Total Boundary Detection*100; wherein Total Boundary Detection is a number of pixels in the Ground Truth and True Detection is a number of pixels in the lane departure warning application.

14. The system of claim 12, the image processing module further comprising sub-grouping the individual time slices having a mean intensity outside a predefined range in to the cluster of slices, and determining a minima between a first maxima and a successive second maxima of the histogram of the cluster of slices.

15. The system of claim 12, wherein the lane images are captured by one or more image capturing unit mounted on a vehicle, wherein the image capturing unit captures continuous image of a lane.

16. A non-transitory computer readable medium having instructions that, when executed by a computing device cause the computing device to:
   receive a plurality of lane images a lane video comprising the plurality of lane images as an input from an image capturing unit;
   process the plurality of lane images into a plurality of time sliced images, wherein each time sliced image contains selection of predefined rows of the plurality of lane images, wherein the plurality of lane images are captured at different time frames;
   determine a histogram of each of the plurality of time sliced images and smoothening the histogram to obtain a smoothened histogram, wherein the smoothening is performed on the histogram to extract low pass filtered envelop of the histogram;
   obtain a threshold value for each of the time-sliced images by extracting a minima between a first maxima and a successive second maxima of the smoothened histogram, wherein the first maxima is a highest peak of the smoothened histogram and the successive second maxima is a following highest peak of the first maxima, wherein extracting the minima between the first maxima and the successive second maxima of the smoothened histogram is termed as Min-Between-Max-Thresholding (MBMT) technique;
   refine the threshold value of the time-sliced images by
      segmenting each of the time sliced images into a predefined number of time slices by further applying time slicing on the each time sliced image,
      calculating a statistical mean variation of the histogram of each of the individual time slices and
      grouping the individual time slices having a mean intensity within a predefined range in to a cluster of time slices, wherein a predefined number of time slices having the mean intensity in the predefined range are grouped and localized, and
      determining the minima between the first maxima and the successive second maxima of the histogram of the cluster of time slices by applying the MBMT technique to obtain refined threshold value for each cluster of time slices;
   detect the lane marking of the lane by extracting mid-points of the lane marking based on the refined threshold value of the time sliced images; and
   determine the ground truth based on the lane marking of the lane for validating the lane departure warning based on a pixel position detected by the lane departure warning with respect to the determined ground truth.

17. The non-transitory computer-readable medium as claimed in claim 16, further comprise validating the lane departure warning based on the pixel position detected by the lane departure warning, with respect to the determined ground truth by calculating based on: Percentage Detection Accuracy=True Detection/Total Boundary Detection*100; wherein Total Boundary Detection is a number of pixels in the Ground Truth and True Detection is a number of pixels in the lane departure warning application.

18. The non-transitory computer-readable medium as claimed in claim 16, wherein the image processing further comprise sub-grouping comprising sub-grouping the individual time slices having the mean intensity outside the predefined range into the cluster of slices and determining a minima between a first maxima and a successive second maxima of the histogram of the cluster of slices.

19. The system of claim 12, wherein the time sliced images after obtaining the refined threshold values are binary images, and wherein the lane markings are represented as white pixels and anything other than lane markings as black pixels in the binary images of the lane.

20. The non-transitory computer-readable medium as claimed in claim 16, wherein the time sliced images after obtaining the refined threshold values are binary images, and wherein the lane markings are represented as white pixels and anything other than lane markings as black pixels in the binary images of the lane.

* * * * *